(12) United States Patent
Iwasaki (10) Patent No.: US 7,239,426 B2
(45) Date of Patent: Jul. 3, 2007

(54) IMAGE CONVERSION APPARATUS, AND IMAGE CONVERSION PROGRAM STORAGE MEDIUM

(75) Inventor: Taiji Iwasaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 929 days.

(21) Appl. No.: 10/231,208

(22) Filed: Aug. 30, 2002

(65) Prior Publication Data
US 2003/0043393 A1 Mar. 6, 2003

(30) Foreign Application Priority Data
Sep. 4, 2001 (JP) .............................. 2001-266700

(51) Int. Cl.
*H04N 1/405* (2006.01)
(52) U.S. Cl. ........................ 358/2.1; 358/3.24; 358/504
(58) Field of Classification Search ................. 358/1.9, 358/2.1, 3.21–3.24, 3.06, 1.4, 504, 406
See application file for complete search history.

(56) References Cited

U.S. PATENT DOCUMENTS

| | | | |
|---|---|---|---|
| 6,226,103 B1* | 5/2001 | Klassen et al. .............. | 358/1.9 |
| 6,575,096 B1* | 6/2003 | Caruthers et al. ........... | 101/491 |
| 6,801,336 B1* | 10/2004 | Cook et al. ................... | 358/1.9 |
| 6,993,149 B2* | 1/2006 | Brunk et al. ................. | 382/100 |
| 2004/0032602 A1* | 2/2004 | Teraue ......................... | 358/1.9 |
| 2004/0190018 A1* | 9/2004 | Marsden et al. ............. | 358/1.9 |

* cited by examiner

*Primary Examiner*—Thomas D. Lee
*Assistant Examiner*—Stephen Brinich
(74) *Attorney, Agent, or Firm*—Sughrue Mion, PLLC (57) ABSTRACT

In an image conversion apparatus converts an input image having a process color component and a spot color component, which is represented by density data for colors, into a halftone dot image represented by halftone dot data for colors of process colors, first halftone dot providing means provides the process color component constituting the input image in form of a halftone dot expression using a predetermined halftone dot sort; spot color separating means separates the spot color component constituting the input image into the process colors; second halftone dot providing means provides the spot color component separated into the process colors by said spot color separating means in form of a halftone dot expression using a halftone dot sort different from the halftone dot sort used in said first halftone dot providing means; and halftone dot synthesizing means synthesizes the process color component provided in form of a halftone dot expression obtained in said first halftone dot providing means with the spot color component separated into the process colors and provided in form of a halftone dot expression obtained in said second halftone dot providing means for each color of the process colors.

6 Claims, 7 Drawing Sheets

IMAGE CONVERSION APPARATUS, AND IMAGE CONVERSION PROGRAM STORAGE MEDIUM

BACKGROUND OF THE INVENTION

1. Field of the Invention

The present invention relates to an image conversion apparatus for converting an input image having a process color component and a spot color component, which is represented by density data for colors, into a halftone dot image represented by halftone dot data for colors of a process color, and an image conversion program storage medium storing an image conversion program, when executed in a computer, which causes the computer to operate as the image conversion apparatus as mentioned above.

2. Description of the Related Art

Hitherto, when an image printing is performed using a printing machine, there is performed such a matter that prior to performing a printing, a printer and the like is used to create a proof image similar to a printed image obtained through printing of the printing machine, and it is examined whether a desired printed matter can be obtained. The printer for creating such a proof image and a computer system into which such a printer is incorporated are referred to as a proofer.

As a result of the examination of the created proof image, when an operator is aware of any unfavorable point, the regulation of conditions having any effect on editing and another final printed matter is carried out to correct unfavorable points, and the proof image is created over again.

In this manner, repetition of the creation of the proof image and the alteration of the conditions makes it possible to finally determine a printing condition for obtaining a desired printed matter.

Here, when a printing machine is used to perform an image printing, process color inks of three colors of C (cyan), M (magenta) and Y (yellow), or four colors of K (black) in addition to C, M and Y, are used to represent various colors by halftone dots. Alternatively, it happens that ink having a color intended to be expressed per se, which is referred to as the spot color ink, is used in addition to those process color inks.

When a proof image similar to the color of a printed image using the spot color ink is created, usually, a printer does not use such a spot color ink, but uses only process color ink of for instance C, M, Y and K to express a color.

In this case, since the printed image is expressed by the process color ink and the spot color ink, a proof image is created in accordance with density data represented by process colors only obtained in such a manner that the color of the spot color ink is separated into process colors of C, M, Y and K, and density data originally represented by process colors of C, M, Y and K is combined (usually added) with density data represented by C, M, Y and K when the spot color is separated into the process colors of C, M, Y and K, for each process color.

Of the proofers for creating a proof image, there is a proofer for creating the proof image in accordance with halftone dot data. In the event that a proof image for a printed image including the spot color is created using such a proofer, the density data represented by process colors only obtained in the manner as mentioned above is converted into the halftone dot data for each process color, so that the proof image is created in accordance with the halftone dot data.

When a proof image of a printed image including the spot color is obtained, it is possible to create the proof image, as mentioned above, in such a manner that the spot color is separated into process colors, and the process colors thus obtained are combined with the components of the original process colors for each color, so that the proof image is created in accordance with image data of the combined process color. However, according to the proof image thus obtained, it is quite unclear as to whether an image of a certain portion of the printed image is represented by components of the spot color or the process color. This brings about a problem that a proof image, which omits important information for evaluation of finish of the printed image, is inadvertently obtained.

In order to solve this problem, it is considered to provide a proofer in which not only the process color but also the spot color are used to create a proof image. However, preparation of such a proofer involves great increment of the cost. Further, in view of the fact that there are many sorts in the spot color, and thus it is difficult to prepare a number of spot colors which is the same as the spot colors for printing. Accordingly, it is unrealistic to provide such a proofer.

SUMMARY OF THE INVENTION

In view of the foregoing, it is an object of the present invention to provide an image conversion apparatus for performing conversion of data, which is suitable for a proofer for creating a proof image using the process color only, and also suitable for creation of a proof image capable of discriminating on the proof image as to whether an image of a certain portion of the printed image is represented by components of the spot color or the process color, and an image conversion program storage medium storing an image conversion program, when executed in a computer, which causes the computer to operate as the image conversion apparatus as mentioned above.

To achieve the above-mentioned object, the present invention provides an image conversion apparatus for converting an input image having a process color component and a spot color component, which is represented by density data for colors, into a halftone dot image represented by halftone dot data for colors of process colors, said image conversion apparatus comprises:

first halftone dot providing means for providing the process color component constituting the input image in form of a halftone dot expression using a predetermined halftone dot sort;

spot color separating means for separating the spot color component constituting the input image into the process colors;

second halftone dot providing means for providing the spot color component separated into the process colors by said spot color separating means in form of a halftone dot expression using a halftone dot sort different from the halftone dot sort used in said first halftone dot providing means; and halftone dot synthesizing means for synthesizing the process color component provided in form of a halftone dot expression obtained in said first halftone dot providing means with the spot color component separated into the process colors and provided in form of a halftone dot expression obtained in said second halftone dot providing means for each color of the process colors.

According to the image conversion apparatus of the present invention, the spot color component is separated into the process colors, the spot color component separated into the process colors is provided in form of a halftone dot expression using a halftone dot sort different from the halftone dot sort used in first halftone dot expression, and the process color component provided in form of a halftone dot expression obtained in the first halftone dot providing is synthesized with the spot color component separated into the process colors and provided in form of a halftone dot expression obtained in the second halftone dot providing for each color of the process colors. Thus, when a proof image is created in accordance with the halftone dot data after the synthesis, the difference between the halftone dot sorts makes it possible to discriminate on the proof image the portion expressed by the first process color and the portion expressed by the spot color.

In the image conversion apparatus according to the present invention as mentioned above, it is preferable that said second halftone dot providing means provides the spot color component separated into the process colors by said spot color separating means in form of a halftone dot expression using a halftone dot sort which is higher in screen ruling as compared with the halftone dot sort used in the first halftone dot providing means.

There is a tendency that the spot color is used in the solid portion (which is high in the dot percent). Accordingly, when the halftone dot providing processing is individually applied to the process color component and the spot color component, the use of the halftone dot sort higher in screen ruling on the spot component may enhance impressions of solid in case of the same dot percent. Thus it is possible that impressions on the image approach impressions that the spot color is used.

To achieve the above-mentioned object, the present invention provides an image conversion program storage medium storing an image conversion program, which causes a computer to operate as an image conversion apparatus when the image conversion program is executed in the computer, said image conversion apparatus converting an input image having a process color component and a spot color component, which is represented by density data for colors, into a halftone dot image represented by halftone dot data for colors of process colors, said image conversion program comprises:

first halftone dot providing means for providing the process color component constituting the input image in form of a halftone dot expression using a predetermined halftone dot sort;

spot color separating means for separating the spot color component constituting the input image into the process colors;

second halftone dot providing means for providing the spot color component separated into the process colors by said spot color separating means in form of a halftone dot expression using a halftone dot sort different from the halftone dot sort used in said first halftone dot providing means; and halftone dot synthesizing means for synthesizing the process color component provided in form of a halftone dot expression obtained in said first halftone dot providing means with the spot color component separated into the process colors and provided in form of a halftone dot expression obtained in said second halftone dot providing means for each color of the process colors.

In the image conversion program storage medium according to the present invention as mentioned above, it is preferable that said second halftone dot providing means provides the spot color component separated into the process colors by said spot color separating means in form of a halftone dot expression using a halftone dot sort which is higher in screen ruling as compared with the halftone dot sort used in the first halftone dot providing means.

DETAILED DESCRIPTION OF PREFERRED EMBODIMENTS

Embodiments of the present invention will be described with reference to the accompanying drawings.

Figure 1:
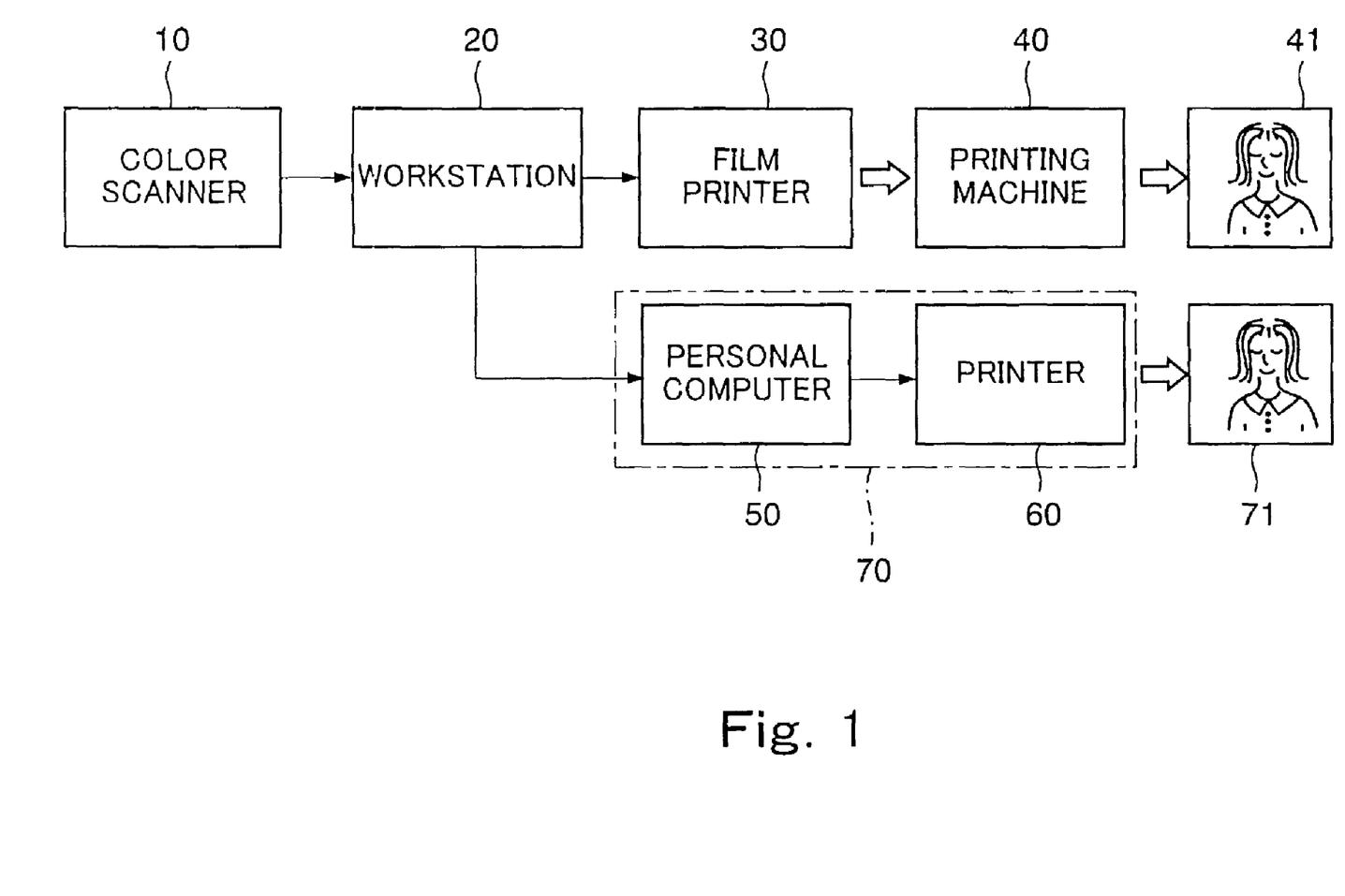
FIG. 1 is a schematic constitution view of a printing proof system into which an image conversion apparatus according to an embodiment of the present invention is incorporated.

FIG. 1 is a schematic constitution view of a printing proof system into which an image conversion apparatus according to an embodiment of the present invention is incorporated.

A color scanner 10 reads an original image and creates image data for four colors consisting of cyan (C) magenta (M), yellow (Y) and black (K), which represent the original image thus read. The image data of CMYK produced by the scanner 10 is fed to a workstation 20. The workstation 20 performs an electronic page make-up in accordance with the entered image data. In the electronic page make-up, data for the spot color other than the four colors of CMYK is added to create image data representative of an image for printing. This image data for printing represents an image consisting of pixels having gradations on the four colors of CMYK and the spot color. When the printing is performed, the image data for printing is converted into image data for plate making representative of a halftone dot image and then fed to a film printer 30. The film printer 30 creates printing film original plates for the four colors of CMYK and the spot color in accordance with the image data for plate making.

Machine plates are created from the printing film original plates and are mounted on a printing machine 40. Ink is applied to the machine plates mounted on the printing machine 40 and then transferred to a sheet for printing to form a printed image 41 on the sheet.

A series of works such that the film printer 30 is used to create the film original plates; the machine plates are created from the printing film original plates and are mounted on the printing machine 40; and ink is applied to the machine plates mounted on the printing machine 40 and then transferred to a sheet for printing to form the printed image 41 on the sheet, is very large scale work and it takes a lot of cost. For this reason, before performing the actual printing work, a proofer 70, which comprises a personal computer 50 and a printer 60, is used to create a proof image 71 in the manner as will be described as follows, and finish of the printed image 41 is confirmed beforehand.

When the proof image 71 is created, the image data for printing, which is created by the electronic page make-up on the workstation 20, is fed to the personal computer 50. The image data for printing fed to the personal computer 50 represents, as mentioned above, an image consisting of pixels having gradations on the four colors of CMYK and the spot color. The personal computer 50 converts the image data for printing into proof image data suitable for the printer 60 which intends to output the proof image 71. The printer 60 receives the proof image data and creates the proof image 71 in accordance with the proof image data.

The printer 60 is a printer for creating a halftone dot image of process colors of four colors consisting of C, M, Y and K. The proofer 70 receives the image data for printing from the workstation 20 shown in FIG. 1 via the computer network, or alternatively through an MO disk (magneto-optical disk).

The proofer 70 creates a proof image in accordance with the image data thus received. Thus, confirmation of the proof image makes it possible to confirm finish of printing beforehand.

Figure 2:
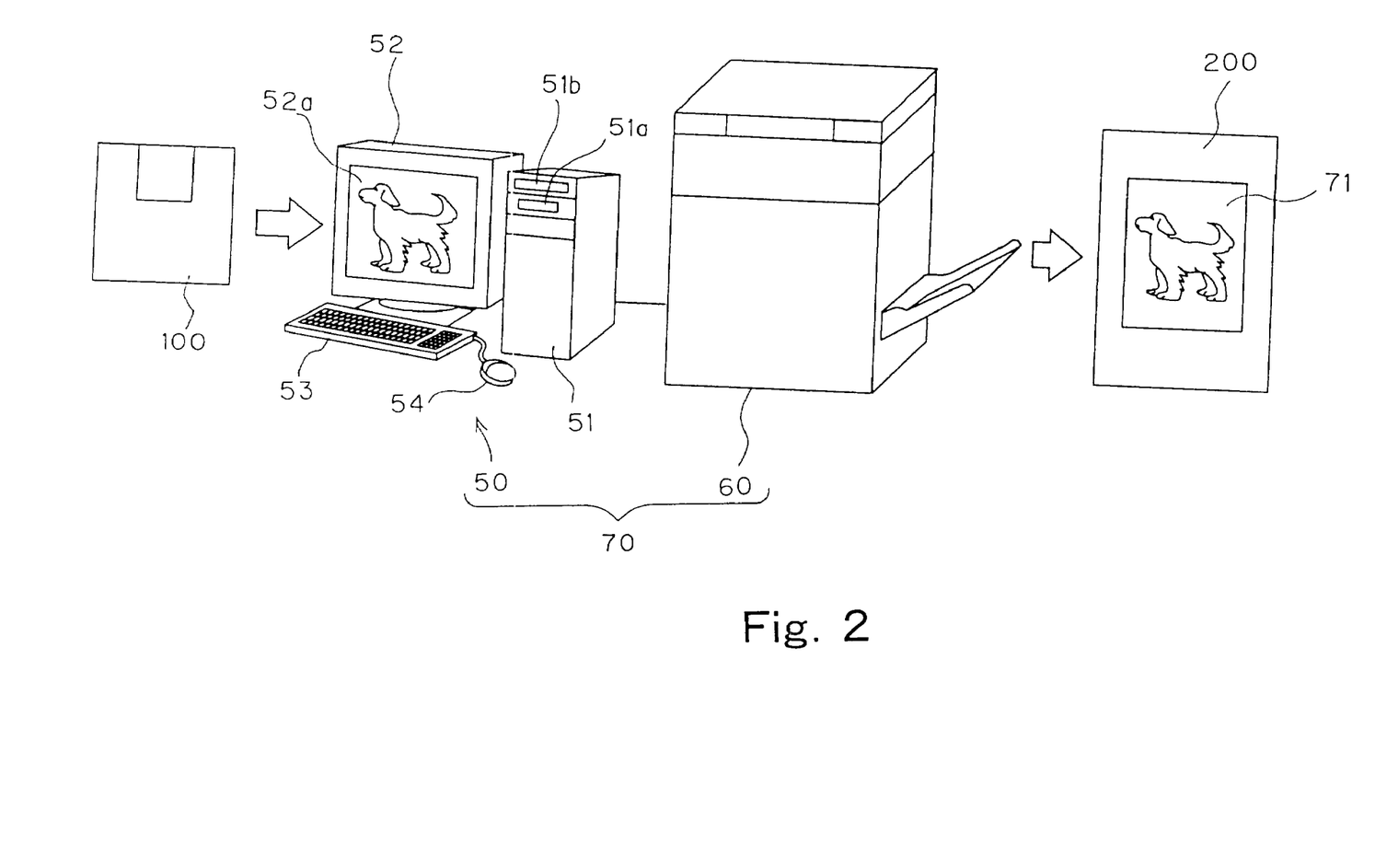
FIG. 2 is a perspective view of a proofer shown in FIG. 1.
Figure 3:
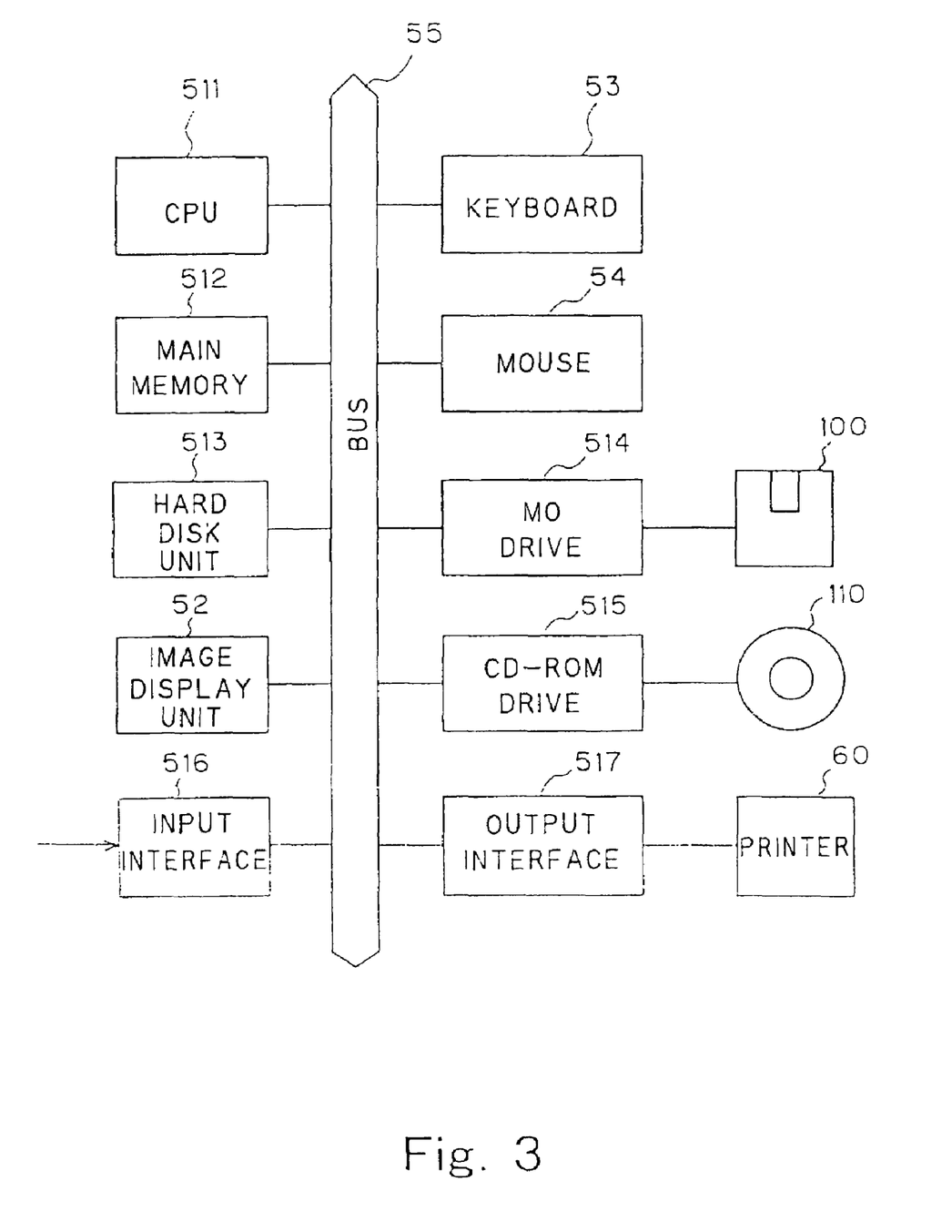
FIG. 3 is a hardware structural view of the proofer shown in FIG. 1.

FIG. 2 is a perspective view of the proofer 70 shown in FIG. 1. FIG. 3 is a hardware structural view of the proofer 70 shown in FIG. 1.

As mentioned above, the proofer 70 comprises the personal computer 50 and the printer 60. The personal computer 50 comprises, on an external appearance, a main frame unit 51, an image display unit 52 for displaying an image on a display screen 52a in accordance with an instruction from the main frame unit 51, a keyboard 53 for inputting various sorts of information to the main frame unit 51 in accordance with a key operation, and a mouse 54 for inputting an instruction according to, for example, an icon and the like, through designation of an optional position on the display screen 52a, the icon and the like being displayed on the position on the display screen 52a. The main frame unit 51 has an MO mounting slot 51a for mounting an MO disk 100, and a CD-ROM mounting slot 51b for mounting a CD-ROM. The personal computer 50 serves as an embodiment of an image conversion apparatus of the present invention.

The printer 60 is a printer for outputting of a proof image, and outputs a proof image 71 on a sheet 200 upon receipt of the halftone dot data from the personal computer 50 in accordance with the instruction by the personal computer 50.

The main frame unit 51 comprises, as shown in FIG. 3, a CPU 511 for executing a various types of program, a main memory 512 in which a program stored in a hard disk unit 513 is read out and developed for execution by the CPU 511, the hard disk unit 513 for saving various types of programs and data, an MO drive 514 for accessing an MO disk 100 mounted thereon, a CD-ROM drive 515 for accessing a CD-ROM 110 mounted thereon, an input interface 516 connected to the workstation 20 (cf. FIG. 1), to receive image data from the workstation 20, and an output interface 517 to transmit image data to the printer 60. These various types of elements are connected via a bus 55 to the image display unit 52, the keyboard 53 and the mouse 54.

The CD-ROM 110 stores therein an image conversion program for causing the personal computer 50 to operate as an image conversion apparatus according to an embodiment of the present invention. The CD-ROM 110 is mounted on the CD-ROM drive 515 so that the image conversion program, which is stored in the CD-ROM 110, is up-loaded on the personal computer 50 and is stored in the hard disk unit 513.

Figure 4:
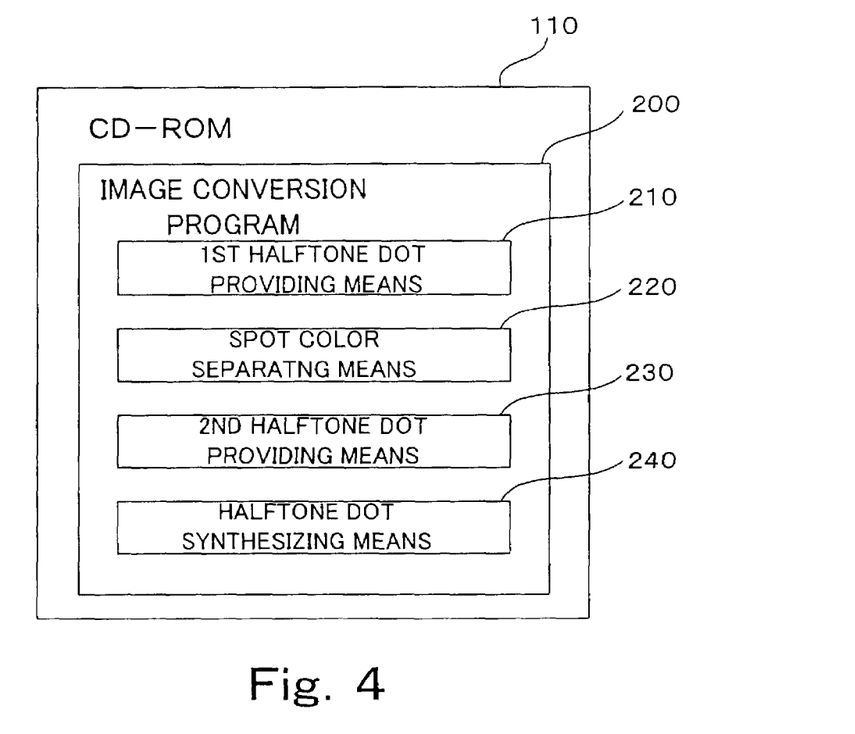
FIG. 4 is a view typically showing an embodiment of an image conversion program according to the present invention.

FIG. 4 is a view typically showing an embodiment of an image conversion program according to the present invention.

An image conversion program 200 comprises first halftone dot providing means 210, spot color separating means 220, second halftone dot providing means 230, and halftone dot synthesizing means 240. Functions of those means of the image conversion program 200 will be described later.

Figure 5:
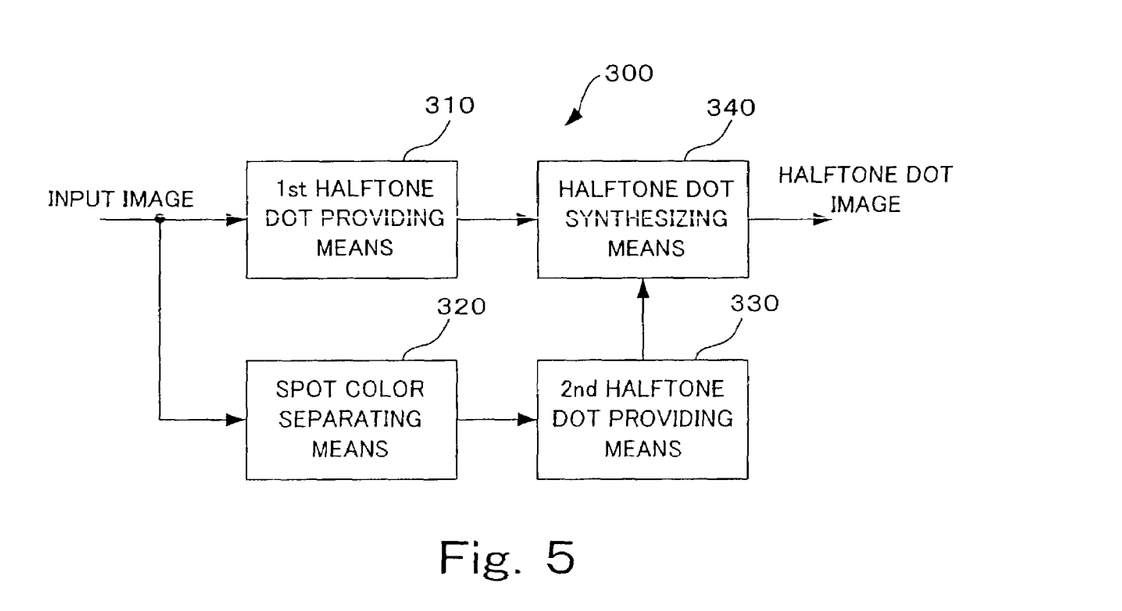
FIG. 5 is a functional block diagram of an embodiment of an image conversion apparatus according to the present invention.

FIG. 5 is a functional block diagram of an embodiment of an image conversion apparatus according to the present invention.

An image conversion apparatus 300 shown in FIG. 5 is implemented when the image conversion program 200 shown in FIG. 4 is installed in the personal computer 50 shown in FIGS. 1 to 3 and is executed by the personal computer 50. The image conversion apparatus 300 shown in FIG. 5 comprises first halftone dot providing means 310, spot color separating means 320, second halftone dot providing means 330, and halftone dot synthesizing means 340.

The means 310 to 340 constituting the image conversion apparatus 300 shown in FIG. 5 correspond to the same named means 210 to 240 constituting the image conversion program 200 shown in FIG. 4, respectively. While the means 310 to 340 constituting the image conversion apparatus 300 shown in FIG. 5 are constructed by compound of the hardware of the personal computer 50 shown in FIGS. 1 to 3, OS (operation system) and the application program, the means 210 to 240 constituting the image conversion program 200 shown in FIG. 4 indicate only the portion of the application program.

Hereinafter, there will be described functions of the means 310 to 340 constituting the image conversion apparatus 300 shown in FIG. 5. This description serves as the explanation of functions of the means 210 to 240 constituting the image conversion program 200 shown in FIG. 4.

The image conversion apparatus 300 shown in FIG. 5 is constructed inside the personal computer 50 shown in FIGS. 1 to 3. The image conversion apparatus 300 receives from the workstation shown in FIG. 1 an image represented by the image data for printing including the spot color component, that is, an input image having the process color components and the spot color component represented by density data for the respective colors.

Figure 6:
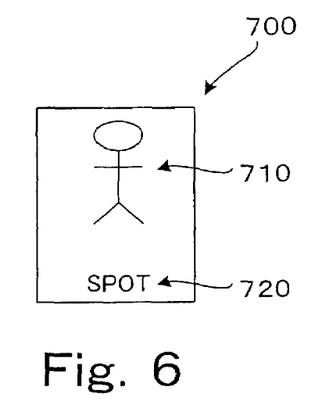
FIG. 6 is a view showing an example of an input image.

FIG. 6 is a view showing an example of an input image.

An input image 700 has a partial image 710 represented by the process colors of C, M, Y and K, and an image portion 720 represented by the spot color.

Figure 7:
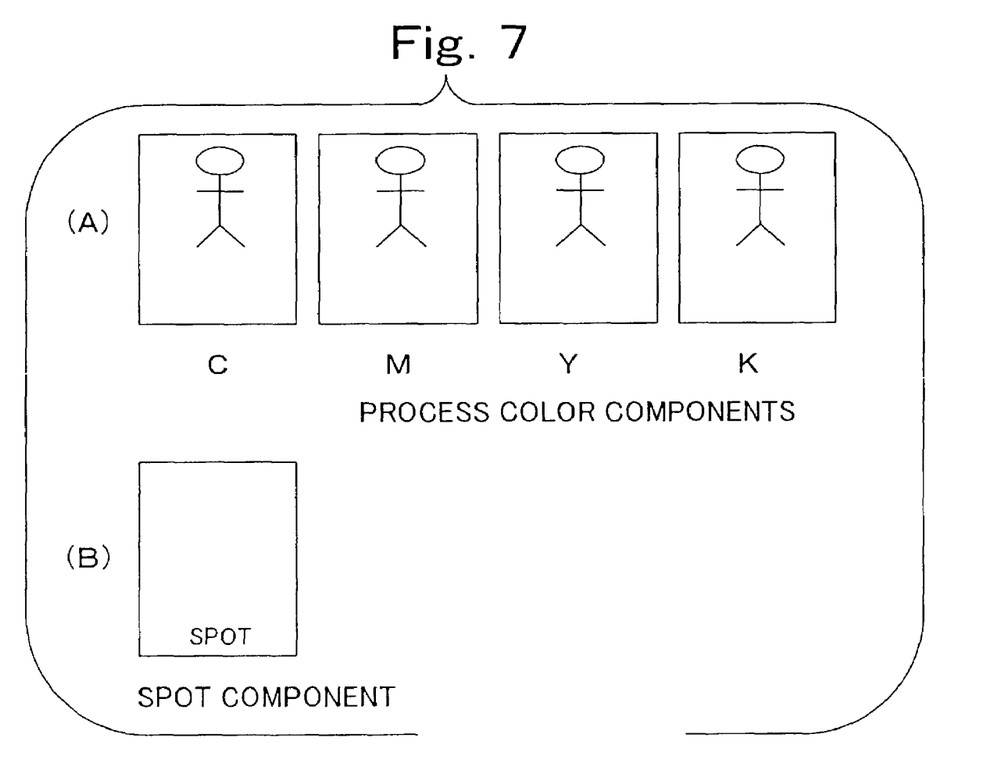
FIG. 7 is a typical illustration of image data representative of input image.

FIG. 7 is a typical illustration of image data representative of the input image shown in FIG. 6.

The input image is represented by density data of the process color components for C, M, Y and K shown in part (A) of FIG. 7 and density data of the spot color component shown in part (B) of FIG. 7. Incidentally, here, for the purpose of simplification, the explanation will be made assuming that the spot color is used with only one color.

The input image fed to the image conversion apparatus 300 shown in FIG. 5 is transferred to the first halftone dot providing means 310 and the spot color separating means 320.

Figure 8:
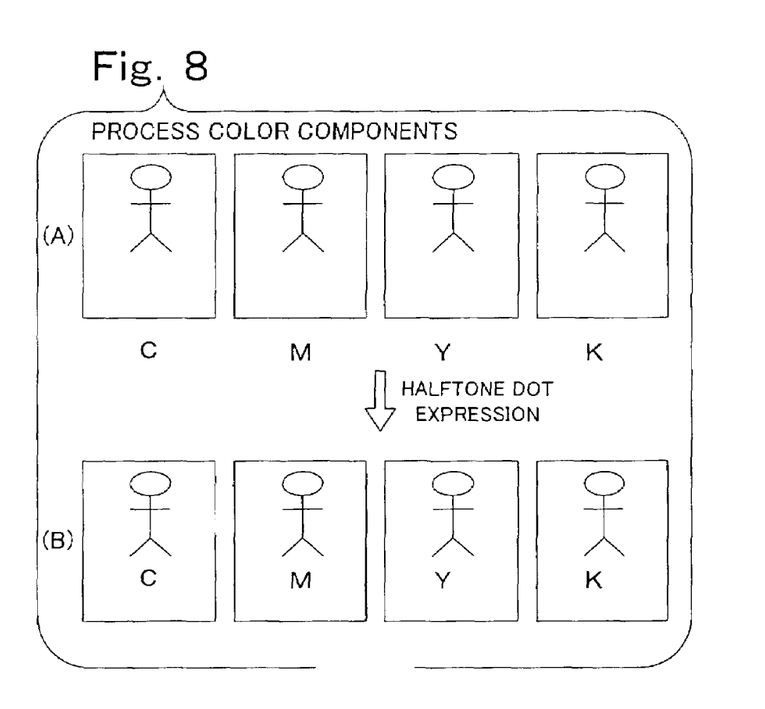
FIG. 8 is an explanatory view useful for understanding the function of first halftone dot providing means.

FIG. 8 is an explanatory view useful for understanding the function of the first halftone dot providing means 310.

A part (A) of FIG. 8 shows the same density data as the density data of the process color components for C, M, Y and K shown in part (A) of FIG. 7. In the first halftone dot providing means 310, the density data representative of the process color components for C, M, Y and K is expressed in form of halftone dot using a first halftone dot sort. A part (B) of FIG. 8 shows the respective components for C, M, Y and K expressed by the halftone dot data obtained by the halftone dot expression.

Figure 9:
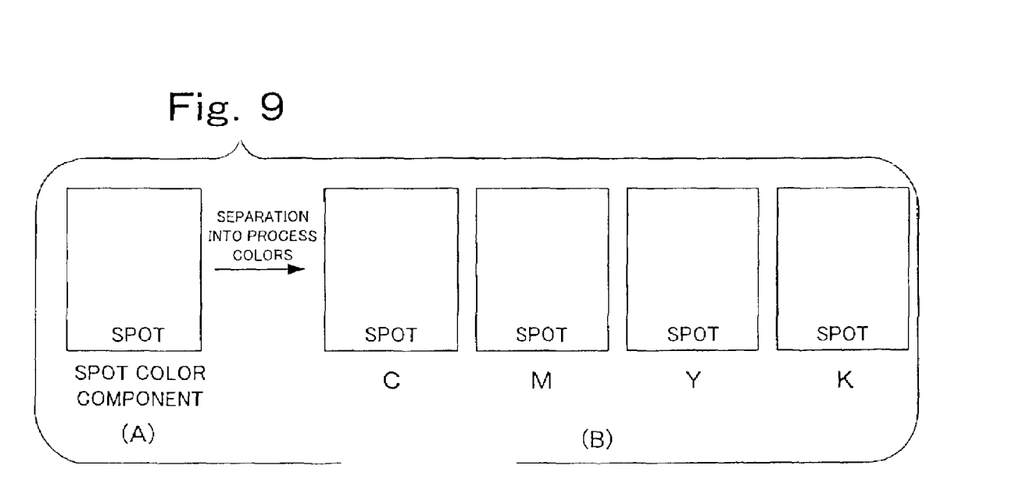
FIG. 9 is an explanatory view useful for understanding the function of spot color separating means.

FIG. 9 is an explanatory view useful for understanding the function of spot color separating means.

Figure 10:
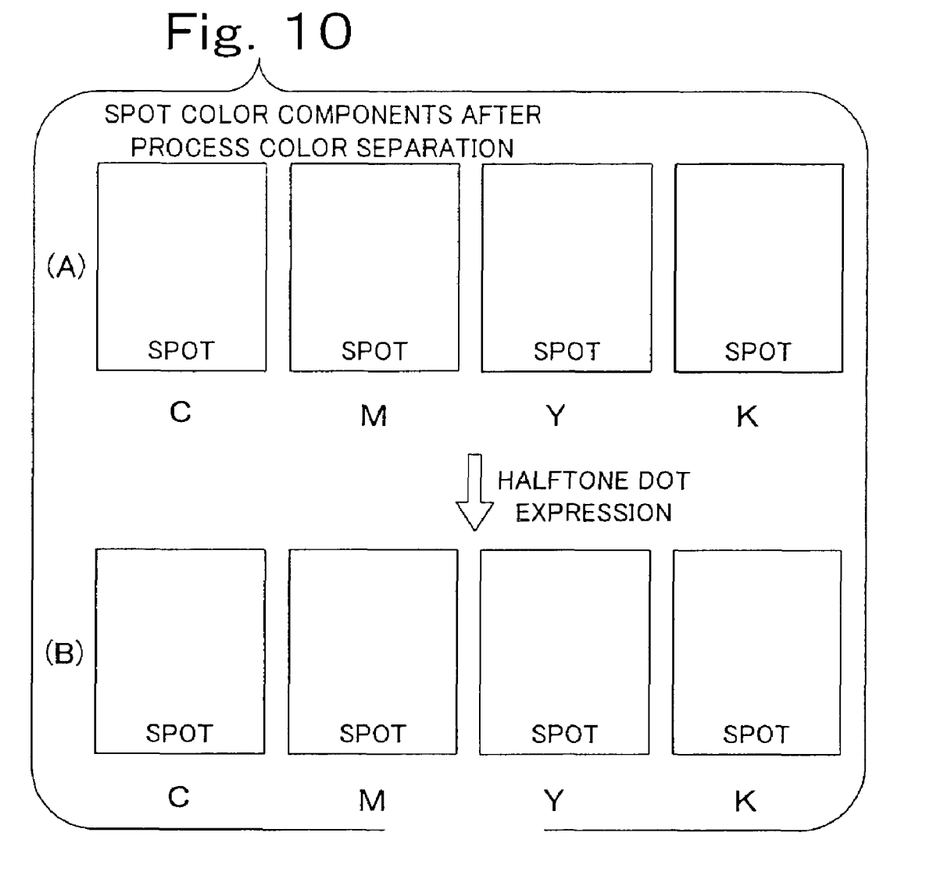
FIG. 10 is an explanatory view useful for understanding the function of second halftone dot providing means.

A part (A) of FIG. 10 shows the same one as the density data for the spot color shown in the part (B) of FIG. 7. In the spot color separating means 320, the density data of the spot color is separated into the density data of the process colors of C, M, Y and K.

The density data of C, M, Y and K obtained in the spot color separating means 320 shown in FIG. 5, which represents the spot color after separation into the process colors, is fed to the second halftone dot providing means 330.

FIG. 10 is an explanatory view useful for understanding the function of the second halftone dot providing means 330.

In the second halftone dot providing means 330, the density data of C, M, Y and K received from the spot color separating means 320 is expressed in form of halftone dot using a second halftone dot sort.

A part (A) of FIG. 10 shows a spot color component represented by the density data of C, M, Y and K before the halftone dot expression. A part (B) of FIG. 10 shows a spot color component represented by the halftone dot data of C, M, Y and K obtained through the halftone dot expression of the density data of C, M, Y and K using the second halftone dot sort.

The second halftone dot sort for providing the spot color component in form of the halftone dot expression, which is used in the second halftone dot providing means 330, is higher in screen ruling as compared with the first halftone dot sort for providing the process color components in form of the halftone dot expression, which is used in the first halftone dot providing means 310. The use of the halftone dot sort higher in screen ruling may enhance impressions of solid in case of the same dot percent. This is coincident with such a matter that it often happens that the spot color is used in the solid portion of an image, and thus it is possible that impressions on the image approach impressions that the spot color is used.

The halftone dot data of the process color components and the halftone dot data in which the spot color component is separated into the process colors, which are created by the first halftone dot providing means 310 and the second halftone dot providing means 330, respectively, are fed to the halftone dot synthesizing means 340 so that both the halftone dot data are synthesized with one another for each of the process colors of C, M, Y and K. According to the present embodiment, regarding the "synthesis", there is performed such a processing that if any one of the halftone dot data is '1' (it indicates an area to which ink is to be applied), the halftone dot data after the synthesis is established with '1', and both the halftone dot data are '0' (it indicates an area to which ink is not to be applied), the halftone dot data after the synthesis is established with '0'.

Figure 11:
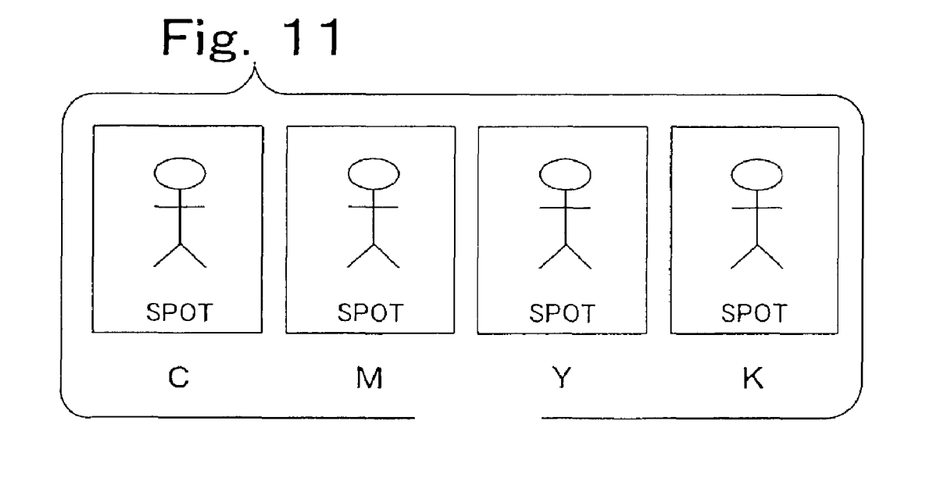
FIG. 11 is an explanatory view useful for understanding the function of halftone dot synthesizing means.

FIG. 11 is an explanatory view useful for understanding the function of halftone dot synthesizing means.

The halftone dot synthesizing means 340 performs the above-mentioned synthesizing processing, and creates halftone dot data of C, M, Y and K in which the process color components of the input image and the spot color components are expressed with different halftone dot sorts.

The halftone dot image expressed by the halftone dot data of C, M, Y and K, which are created by the halftone dot synthesizing means 340, are fed to the printer 60 shown in FIG. 1 and FIG. 2 to create a proof image based on the halftone dot image expressed by the halftone dot data of C, M, Y and K.

This proof image is one in which a portion expressed by process color inks and a portion expressed by spot color inks on a printed image are expressed by mutually different halftone dot sorts. Thus, an observer of the proof image can understand where the spot color is used and suitably perform the evaluation of the proof image.

Incidentally, according to the present embodiment, while the spot color is separated into four process colors of C, M, Y and K, it is acceptable that while process colors are four colors of C, M, Y and K, the spot color is separated into three process colors of C, M and Y.

Further, according to the present embodiment, while there is explained an example in which a proof image of four colors of C, M, Y and K, it is noted that the present invention is applicable also in the event that the proof image is created by the process colors of three colors of C, M and Y. In this case, the spot color is also separated into the process colors of C, M and Y and is expressed in form of the halftone dot.

Furthermore, according to the present embodiment, while there is explained an example in which the second halftone dot providing means uses the second halftone dot sort which is higher in screen ruling as compared with the first halftone dot sort which is used in the first halftone dot providing means, it is not always necessary to vary the screen ruling. The use of halftone dot sorts, which are mutually different in geometry of the halftone dot for instance, while the screen ruling is the same as one another, makes it possible to discriminate differences between the process color components and the spot color components on the proof image.

As mentioned above, according to the present invention, it is possible to convert data into image data for obtaining a proof image capable of recognizing as to where the spot color is used in the printed image.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image conversion apparatus for converting an input image having a process color component and a spot color component, which is represented by density data for colors, into a halftone dot image represented by halftone dot data for colors of process colors, said image conversion apparatus comprises:

first halftone dot providing means for providing the process color component constituting the input image in form of a halftone dot expression using a predetermined halftone dot sort;

spot color separating means for separating the spot color component constituting the input image into the process colors;

second halftone dot providing means for providing the spot color component separated into the process colors by said spot color separating means in form of a halftone dot expression using a halftone dot sort different from the halftone dot sort used in said first halftone dot providing means; and halftone dot synthesizing means for synthesizing the process color component provided in form of a halftone dot expression obtained in said first halftone dot providing means with the spot color component separated into the process colors and provided in form of a halftone dot expression obtained in said second halftone dot providing means for each color of the process colors.

2. An image conversion apparatus according to claim 1, wherein said second halftone dot providing means provides the spot color component separated into the process colors by said spot color separating means in form of a halftone dot expression using a halftone dot sort which is higher in screen ruling as compared with the halftone dot sort used in the first halftone dot providing means.

3. The apparatus of claim 1, wherein the first halftone dot providing means and the second halftone dot providing means form halftone dot expressions independently of each other.

4. An image conversion program storage medium storing an image conversion program, which causes a computer to operate as an image conversion apparatus when the image conversion program is executed in the computer, said image conversion apparatus converting an input image having a process color component and a spot color component, which is represented by density data for colors, into a halftone dot image represented by halftone dot data for colors of process colors, said image conversion program comprises steps of:

providing the process color component constituting the input image in form of a halftone dot expression using a predetermined halftone dot sort as a first halftone dot output;

separating the spot color component constituting the input image into the process colors as spot color separation;

providing the spot color component separated into the process colors in form of a halftone dot expression using a halftone dot sort different from the halftone dot sort used for said first halftone dot output as second halftone dot output; and synthesizing the process color component provided in form of a halftone dot expression obtained for said first halftone dot output with the spot color component separated into the process colors and provided in form of a halftone dot expression obtained for said second halftone dot output for each color of the process colors.

5. The image conversion program storage medium according to claim 4, wherein providing the second halftone dot output provides the process colors from the spot color separation in form of a halftone dot expression using a halftone dot sort which is higher in screen ruling than the halftone dot sort used for the first halftone dot output.

6. An image conversion apparatus for generating a proof image, the image conversion apparatus comprising:

a first halftone dot providing unit which intakes a process color component of an input image to generate a first halftone dot expression using a first halftone dot sort;

a spot color separating unit which converts a spot color component of the input image into a converted process colors;

a second halftone dot providing unit which intakes the converted process colors to generate a second halftone dot expression using a second halftone dot sort; and a synthesizing unit which synthesizes the first halftone dot expression and the second halftone dot expression to produce an output halftone dot image, wherein the input image includes the process color component and the spot color component.

* * * * *